United States Patent
Bolduc et al.

(10) Patent No.: US 6,195,426 B1
(45) Date of Patent: *Feb. 27, 2001

(54) SERVICE PROVIDING CUSTOMIZED INFORMATION TO QUEUING CUSTOMERS

(75) Inventors: Raymond L. Bolduc, Morganville; Robert Finberg, Flemington; Robert Edward Markowitz, Glen Rock; Kenneth H. Rosen, Middletown; Steven Charles Salimando, Little Silver, all of NJ (US)

(73) Assignee: AT&T Corp., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,108

(22) Filed: Dec. 11, 1997

(51) Int. Cl.$^7$ .................................................. H04M 3/00
(52) U.S. Cl. ........................ 379/266; 379/265; 379/88.2; 379/88.22
(58) Field of Search .................... 379/266, 265, 379/309, 215, 88.19, 88.2, 88.21, 210, 211, 212, 93.03, 88.22, 88.23, 88.24, 88.25, 88.26, 88.27, 88.28; 370/352

(56) References Cited

U.S. PATENT DOCUMENTS

| | | | |
|---|---|---|---|
| 5,056,086 | * 10/1991 | Libonati | 379/283 |
| 5,181,236 | * 1/1993 | LaVallee et al. | 379/266 |
| 5,181,238 | * 1/1993 | Medamana et al. | 379/91.02 |
| 5,181,239 | * 1/1993 | Jolissaint | 379/212 |
| 5,185,782 | * 2/1993 | Srinivasan | 379/266 |
| 5,187,735 | * 2/1993 | Herrero Garcia et al. | 379/212 |
| 5,239,577 | * 8/1993 | Bates et al. | 379/212 |
| 5,444,774 | * 8/1995 | Friedes | 379/266 |
| 5,684,872 | * 11/1997 | Flockhart et al. | 379/265 |
| 5,729,593 | * 3/1998 | Baker et al. | 379/266 |
| 5,768,356 | * 6/1998 | McKendry et al. | 379/201 |
| 5,825,856 | * 10/1998 | Porter et al. | 379/93.12 |
| 5,970,124 | * 10/1999 | Csaszar et al. | 379/88.18 |

* cited by examiner

*Primary Examiner*—Krista Zele
*Assistant Examiner*—Benny Q. Tieu

(57) ABSTRACT

A communication system that provides information to customers holding in a queue. Upon arrival to the queue, the queue identifies the customer and further identifies information that is related to the customer's motivation for entering the queue from the customer's identity. The queue selects individual messages from the relevant information for presentation to the customer. Certain messages may be prioritized over others based on the queue experience with other customers or based on external events that raise the likelihood that the message is relevant. The communication system may operate in a telecommunication network or a computer network.

46 Claims, 4 Drawing Sheets

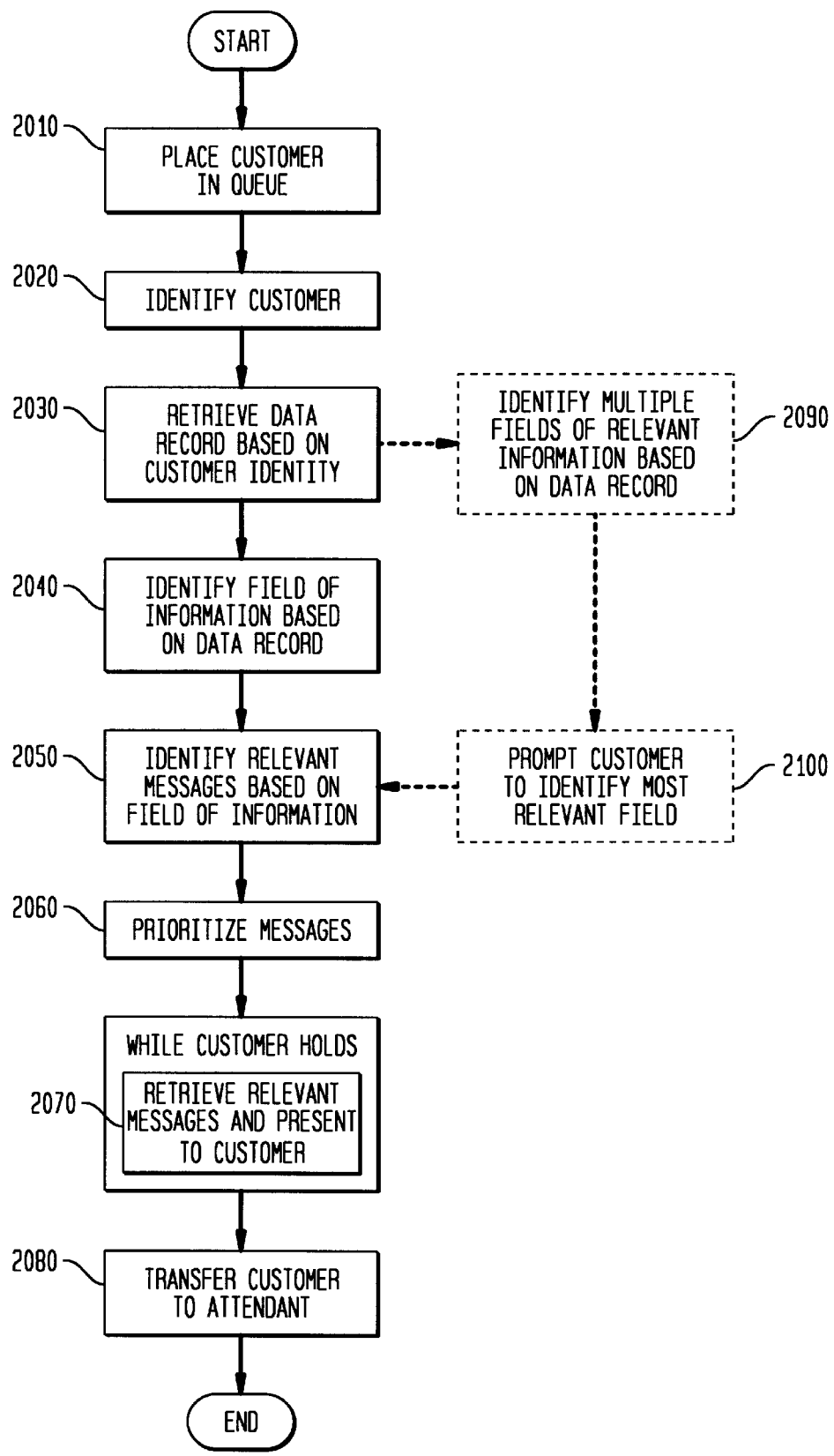

SERVICE PROVIDING CUSTOMIZED INFORMATION TO QUEUING CUSTOMERS

BACKGROUND OF THE INVENTION

The present invention relates to a communication service that provides customized information to a customer holding in queue.

Customer support "hotlines" has become a necessary feature of customer service. Customers call in with questions or problems associated with a vendor's goods or services ("products"), seeking guidance from representatives of the vendor. Typically, the vendor hires a number of attendants to staff the hotline and field customer questions. When all attendants are occupied with customers, additional customers that call in are placed in a queue to hold until an attendant becomes available. Communications equipment may maintain the queue of holding customers.

The maintenance and support of these hotlines is expensive. Vendors must hire and train attendants to become familiar with the vendor's products and services. The vendor may offer a substantial number of different products. Thus, a vendor makes a substantial investment in the personnel that it hires to staff the hotlines. However, because customers typically call with routine uncomplicated questions, the expense of training attendants and maintenance of the hotline, while necessary to maintain proper customer relations, may not be fully realized.

Attempts to reduce the number of attendants that staff the hotlines causes customer relations problems for a vendor. If the vendor were to reduce the number of attendants, a greater number of customers are placed in queue. Queue wait times increase and customer dissatisfaction grows. Some vendors may attempt to answer the customer's questions by answering the customer's question while the customer holds. Using conventional "broadcast on hold" circuitry, the queue system provides general information to holding customers. Under this measure, the vendor provides general purpose information in an attempt to service the customer's needs without having the customer advance through the queue and reach an attendant. However, when the vendor offers a variety of products these attempts often are stymied. Information that is relevant to all products often is too general to be useful. Information that specifically relates to one of the vendor's products may provide no useful information regarding other products. Neither services the customer's needs. As a result, the customer stays in the queue.

Accordingly, there is a need in the art for a queuing system that provides meaningful information to customers regarding information of interest to them. There is a need in the art for such a queuing system that provides information, such as commonly known frequently asked questions ("FAQs") to customers based on their identity.

SUMMARY OF THE INVENTION

The disadvantages of the prior art are alleviated to a great extent by a communication system that provides information to a customer while in a queue. The information is selected from a universe of information based upon a statistical likelihood that it is relevant to the customer's motivation for entering the queue.

Upon arrival to a queue, the queue identifies the customer. Based on the customer's identity and/or optional customer input, the queue identifies information that is related to the customer's motivation for entering the queue. The queue selects individual messages from the relevant information for presentation to the customer. Certain messages may be prioritized over others based on the queue experience with other customers or based on external events that raise the likelihood that the message is relevant.

BRIEF DESCRIPTION OF THE DRAWINGS

FIG. 4 is a flow diagram of a method of operation of the embodiment of FIG. 3.

DETAILED DESCRIPTION

Figure 1:
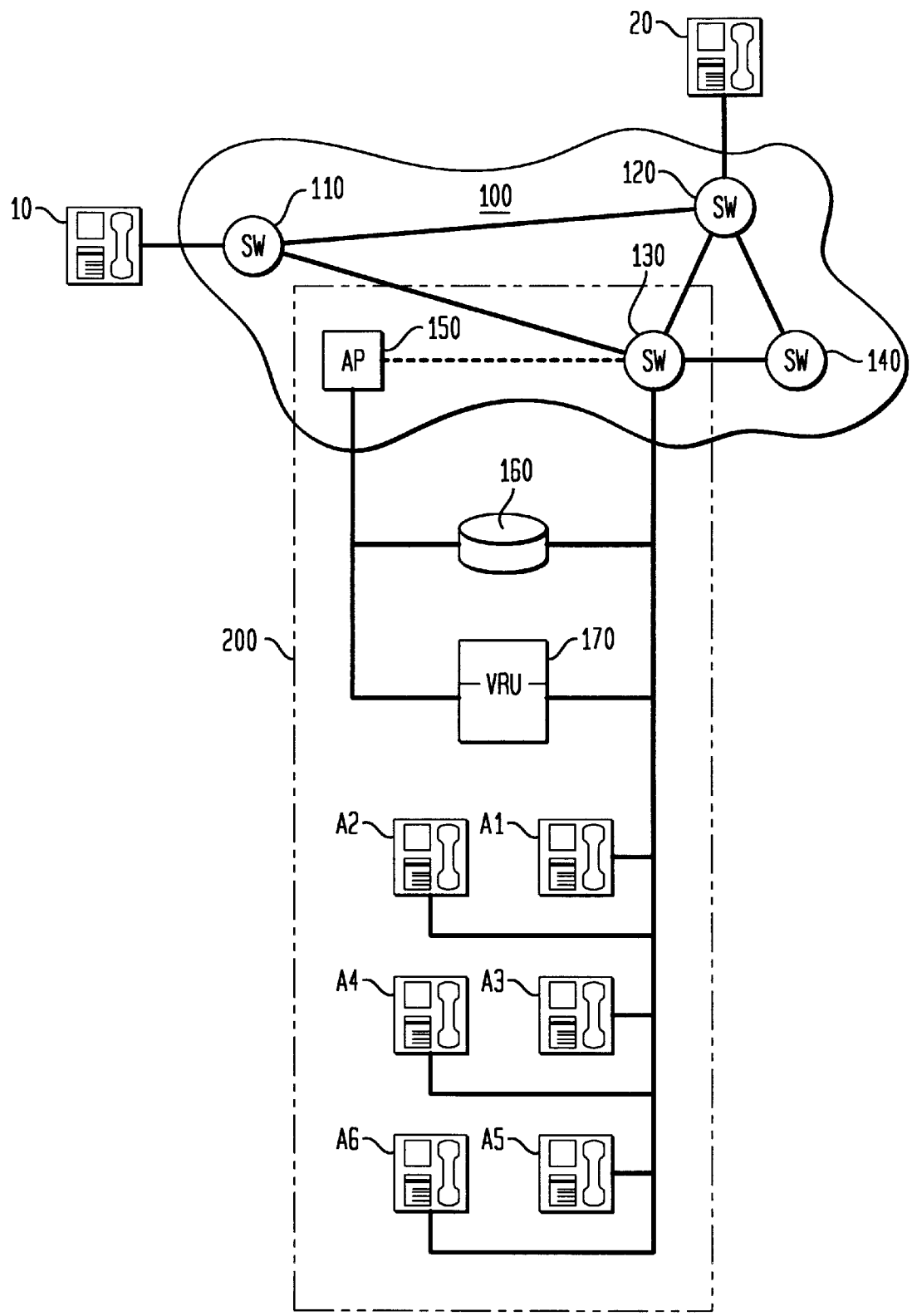
FIG. 1 is a block diagram of a first embodiment of the present invention.

Turning now to FIG. 1, there is shown a communication network 100 provided in accordance with the present invention. The communication network 100 is populated by a number of switches 110–140. An adjunct processor 150 may be provided in communication with a predetermined switch, such as switch 130, within the communication network 100 or provided in communication with switching equipment on a periphery of the communication network 100, such as a private branch exchange. Although the present invention finds application both within and without the communication network 100, to facilitate the presentation, the invention will be described in the context of a switch 130 provided in communication with the communication network 100.

The invention provides a queue system in communication with the communication network. The system 200 provides an adjunct processor 150 in communication with the switch 130 and also in communication with a database 160. Further, the adjunct processor 150 is provided in communication with a Voice Response Unit ("VRU") 170. The queue system 200 may or may not be collocated with attendants (represented as A1–A6) that provide the service sought by the customer.

The database 160 contains customer profile data records (not shown) of each customer. They identify customers by identifiers such as by home telephone number, by a customer identification number such as an account number, by model numbers of products that the customers may own or by telephone numbers that the customers dialed that caused them to be routed to the queue. The data records also associate these identifiers with products or subject matter associated with the customer. For example, for a particular customer, a data record may identify what products the customer owns, when the customer bought the product, the configuration of the customer's product and the customer's location. Further, the data records may contain administrative data, such as an identification of messages that have been played to the customer previously, messages that have answered previous questions of the customer, an identifier of the customer's level of expertise with the product. Typically, the customer profile is established by a pre-registration process initiated by the customer. It is updated over time.

The database 160 also may store files containing messages available to be played to an appropriate customer. The message files may be known audio files or text files to be converted by known text-to-audio circuitry. Also, the database 160 associates each message with a message profile that may indicate: product(s) to which the message relates, a relevance counter indicating the number of times the message has answered customer questions and the level of expertise associated with the message. The relevance counter may be weighted to represent the "timeliness" of the message, so that messages that recently answered customer questions are preferred over messages that answered customer questions a further time in the past.

The present invention services customers who are in a telecommunications queue waiting on hold to speak with a human attendant. Conventional applications include technical support hotlines offered by vendors or service providers. Typically, the customer dials a number associated with the hotline. The customer's call is routed by the communication network 100 to the queue system 200. The dialed telephone number may be product specific. For example, where the queue system 200 services a number of different software products a first telephone number may be dialed to ask questions regarding a word processing product supported by the queue; a second telephone number may be dialed to ask questions regarding a spreadsheet program supported by the queue. Although different numbers are dialed by the customer in these two examples, network 100 may be programmed to route the customer to the same queue system 200. As noted, data records in database 160 may be indexed by the dialed telephone number to properly associate the customer with the products about which they wish to ask questions.

Figure 2:
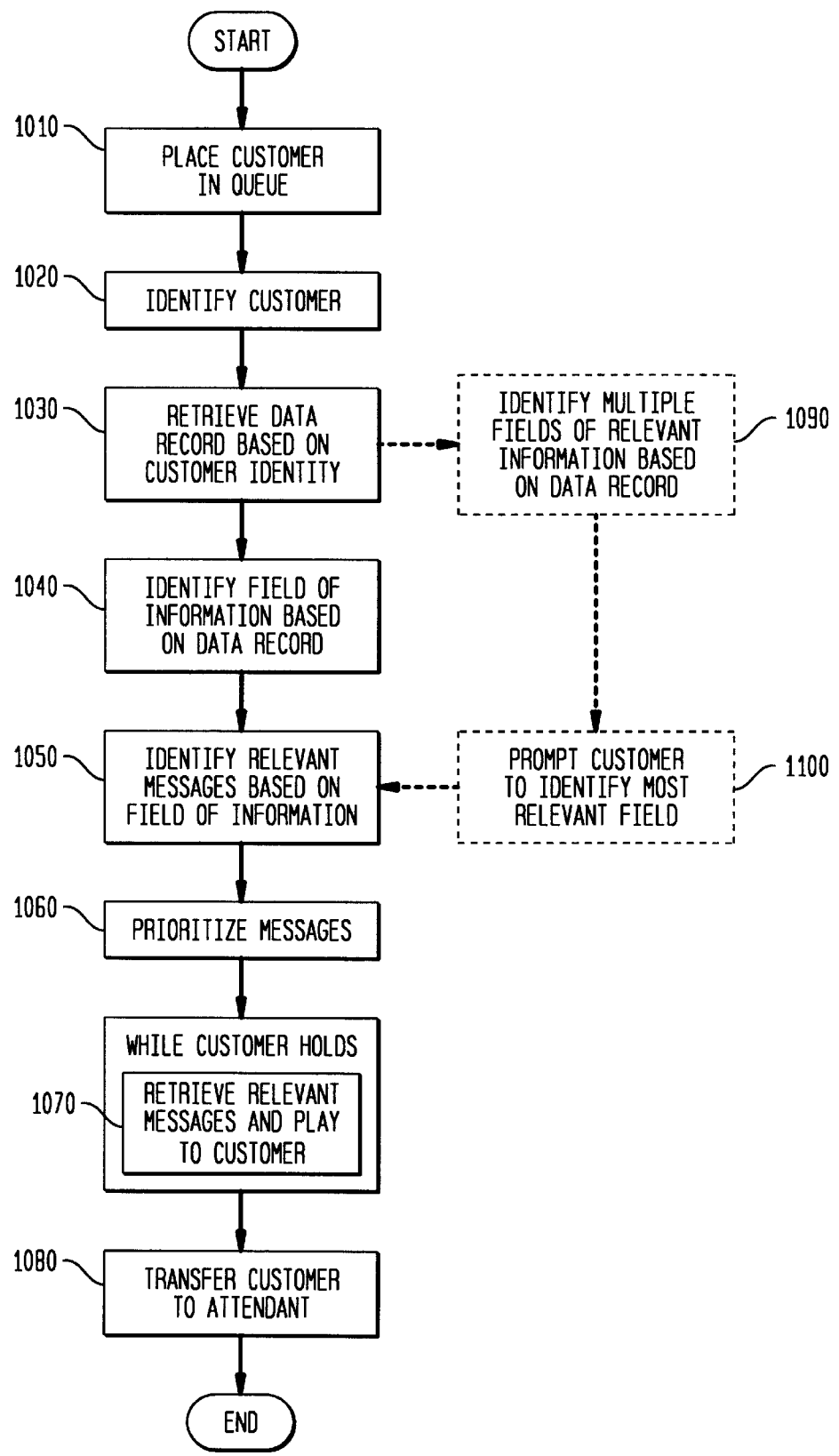
FIG. 2 is a flow diagram of a method of operation of the embodiment of FIG. 1.

FIG. 2 illustrates operations conducted by the adjunct processor 150 according to software or firmware resident thereon. Upon the arrival of a new customer, the adjunct processor 150 causes the switch 130 to place the customer in a queue (Step 1010). Once the customer is holding, the adjunct processor 150 identifies the customer (Step 1020). As noted above, to identify the customer, the adjunct processor 150 receives whatever customer identifiers are available for that particular call. The adjunct processor 150 may attempt to identify a data record by referring an automatic number identifier ("ANI") signal, a signal provided by the network 100, to the queue system 200 representing the telephone number from which the customer is calling, to the database 160. Alternatively, the adjunct processor 150 may refer the dialed telephone number to the database 160 or any other appropriate identifiers. The adjunct processor 150 may cause the VRU 170 to query the customer to identify, for example, an account number, an ID number, a home telephone number or products that he called about. The customer may enter the information by touch tones or speech, both of which may be detected by VRU 170.

Once the customer is identified, the adjunct processor 150 retrieves the customer's data record (Step 1030). From the record, the adjunct processor 150 identifies a field of information, such as products or services, that is relevant to the customer (Step 1040). The adjunct processor 150 then identifies messages that are associated with the field of information (Step 1050). Typically, several messages will be associated with the field of information. The adjunct processor 150 prioritizes each message and arranges them into an order for presentation to the customer (Step 1060). The adjunct processor 150 causes the VTU 170 to play the messages in order over the telephone connection as the customer holds in queue (Step 1070).

Although the queue system 200 attempts to answer customer questions without forcing the customers to wait until an attendant becomes free, it transfers the customer to an attendant when the customer advances through the queue and an attendant becomes available (Step 1080).

The customer may be associated with more than one product offered by the vendor. In such a case, the database 160 associates the customer's ANI with the multiple products. The adjunct processor detects the relevant fields from the data record (Step 1090). As the customer enters the queue, the adjunct processor 150 may prompt the customer to identify the individual product that the customer is calling about (Step 1100). For example, the adjunct processor 150 may generate an audio prompt identifying each of the products or combinations of products that the database 160 associates with the customer and asks the customer to identify the product that the customer is calling about. The customer may identify the product through speech or dialed tones from a telephone handset. The VRU 170 may be configured to detect and identify either speech or dialed tones. Once the customer has identified the product, the adjunct processor 150 cycles through the messages as above.

The adjunct processor 150 also detects activity from the queuing customer to indicate that his question has been answered. The adjunct processor 150 monitors signals received from the customer to determine if the customer disconnects and removes himself from the queue. Typically, upon entering the queue, the adjunct processor 150, via the VRU 170, requests the customer to indicate when his question has been answered. The VRU 170 detects a speech signal or dialed tone that indicates that the customer is disconnecting because he is satisfied. When the adjunct processor 150 is informed of the event, it edits the profiles of both the message and the customer indicating that the current message answered the customer's question.

Alternatively, the adjunct processor 150 may request the customer to identify when the customer is disconnecting because he is dissatisfied with his progress through the queue. Again, the customer may so indicate through either speech or dialed tones.

The adjunct processor 150 also may note telephone numbers of the customers that disconnect without indicating satisfaction or dissatisfaction. Such information provides the vendor an opportunity to contact the "silent" customer at a later date to inquire his motivations for disconnecting. By monitoring these silent customers, the adjunct processor 150 may provide the vendor an opportunity to audit the effectiveness of the service provided by the present invention.

Additionally, the adjunct processor 150 may permit customers to abort presentation of messages on command. The adjunct processor 150 may cause the VRU 170 to detect certain codes representing an abort command. For example, the customer may dial a touch tone code, such as "*", or enter a spoken command to command the system to advance to the next message. In response, the adjunct processor 150 terminates presentation of the current message and advances to the next message in order.

As noted, the adjunct processor 150 assigns a priority to each relevant message. The priority of a message may be subject to several factors, including: the history of the calling customer, the customer's level of expertise, the products owned and configurations of those products, the relevance counter and any keyword search entered by the customer.

The first available factor is the history of the customer himself. The queue system 200 may be configured to identify in the customer's data record each message played to a customer when the customer holds in the queue. For subsequent calls from the same customer, the adjunct processor 150 may reduce any priority that would be assigned to messages that were played previously to the customer. This priority reduction assumes that the customer need not listen to messages that he has heard before. For certain customers, however, the inverse assumption may be made. A customer may call to listen to messages that once solved his problem but cannot be recalled. In this instance, when the customer calls back to the queue, the adjunct processor 150 may increase the priority of any messages that had been presented to the customer previously.

Also, the queue system 200 may be programmed to implement either scheme selectively. If the customer has called in a sufficient number of times, the adjunct processor 150 may be programmed to examine the customer's history and determine whether the customer has exhibited behavior consistent with the priority reduction or enhancement scheme. The adjunct processor 150 may toggle between priority reduction or enhancement when data records of specific customer indicate such a preference.

Messages may be prioritized by the customer's level of expertise. The customers during registration may indicate, for example, that he has little, some, or a great deal of experience with the vendor's products or services. This indication may be recorded in the customer profile. As noted, messages also may possess a level of expertise indicator. Prioritization of a particular message may be influenced by a correlation between the expertise indicator and the customer's classified level of expertise. Also, through use of the system, the system may modify the classification attributed to a particular customer if a pattern is established that messages of another level of expertise address the customer's questions. For example, a customer who indicated that he has a low level of expertise may prove to be quite sophisticated. Simplistic messages that are associated with the customer's classification may prove to be unhelpful. The customer's classified level of expertise may be adjusted if more sophisticated messages more adequately answer the customer's questions.

The adjunct processor 150 may prioritize relevant messages based on an identification of products owned and the configurations of the products. Certain releases of a product may cure errors observed in earlier releases. Because the earlier releases may be in use by the public, the data records maintain information on the releases owned by various customers and prioritize messages accordingly.

Additionally, the adjunct processor 150 may prioritize messages based on any statistically demonstrated relevance that the messages hold for other customers that own similar products. Each time a message is played to a customer and answers the customer's question, the adjunct processor increments the relevance counter of the message. Thus, the statistics of the messages are kept current. When a new customer arrives at the queue and the adjunct processor 150 determines to play messages associated with the product, the adjunct processor 150 determines how many times a particular message has answered questions of other customers and prioritizes the message accordingly.

The adjunct processor 150 also may prioritize messages by performing a keyword search on the messages themselves. The adjunct processor 150 may cause the VRU 170 to ask the customer to verbally describe his reason for calling. The VRU 170 captures the caller's speech and converts it to text. The processor 150 identifies keywords within the caller's speech and performs a traditional keyword search on messages contained in the database 160. Any messages containing the keywords are assigned a high priority.

The information played to the customer may include information regarding product upgrades and related products. Such messages may be marketing oriented, interspersed with traditional messages intended to answer the customer's questions regarding the product.

Figure 3:
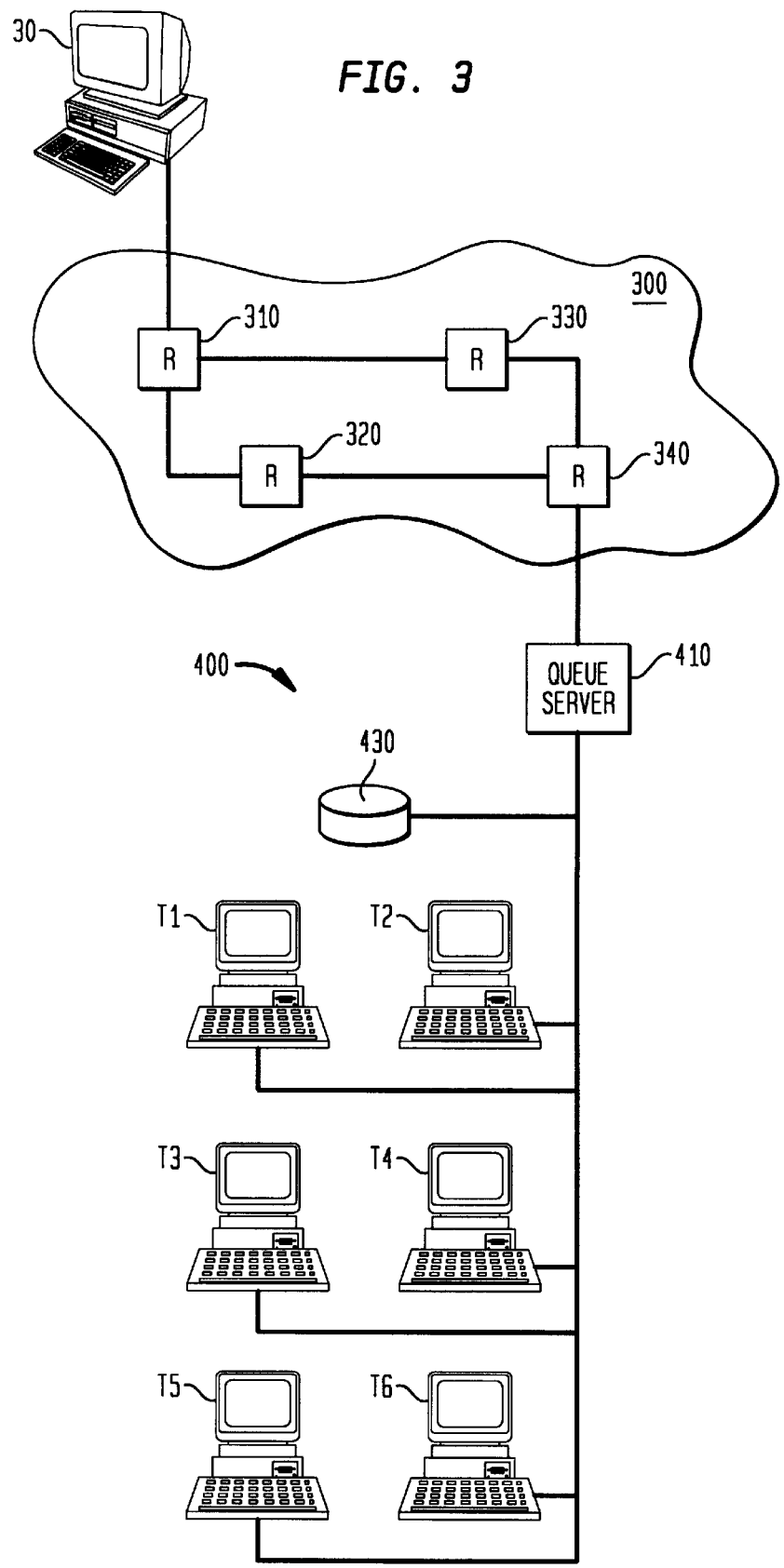
FIG. 3 is a block diagram of a second embodiment of the present invention.

The present invention finds application when a customer contacts the vendor through a computer service such as the Internet. Such an embodiment is shown in FIG. 3. In FIG. 3, a queuing system of the present invention may be provided on a computer server 400 provided in communication with the computer services network 300. The computer services network 300 is populated by a number of routers 310–340 that route data packets from an originating computer to a destination computer based upon address headers contained within the data packet.

A queue server 410 is provided in communication with the computer network 300. The queue server 410 is provided with a database 430 that associates customer identifiers with products supported by the queue. The identifiers may be the customer's network address, supplied automatically by the network 300, or a log on ID or an e-mail address, which may be supplied by the customer. The database also stores the administrative information noted above with respect to the telephonic embodiment.

The database 430 may contain text messages for display on a customer's computer terminal such as terminal 30 or audio, video or multimedia files for display at the terminal.

The customer may enter the computer queue by causing his terminal 30 to address the queue server 410 according to conventional techniques. By addressing the server 410, the computer network 300 provides a network address of the customer's terminal 30 to the queue server 410. In the Internet example provided above, the network address would be the well-known internet protocol ("IP") address.

Operation of the queue system 400 is shown in FIG. 4. Upon receipt of a message from the customer's terminal 30, the queue server 410 places the customer in a queue according to conventional techniques (Step 2010). The queue server also identifies the customer by whatever identifiers are available (Step 2020). Once identified, the queue server 410 retrieves a data record from the database 430 (Step 2030). From the data record the queue server 410 identifies information likely to be relevant to the customer ("field of relevant information") (Step 2040).

The queue server 410 then identifies messages related to the field (Step 2050) and prioritizes them in a manner similar to that described above with respect to the telephonic queue server (Step 2060). Once the queue server 410 identifies messages, it delivers them to the customer at the terminal 30 (Step 2070). While the customer remains in the queue, the queue server 410 retrieves the messages and delivers them to the customer. The queue server 410 may deliver the messages to the customer as text, audio, video, or a multimedia presentation. Finally, if the customer advances through the queue, the queue server may transfer the customer to an attendant (Step 2080).

Given the computer environment, the queue system 400 may provide an additional level of sophistication. The queue server 410 may prompt the customer to enter a textual description of his question. The customer may enter the information via a forms based interface that supplies specific information about the customer's product, its environment, the customer's problem, etc.; the question alternatively may be posed as a free form message, such as by e-mail. In addition to prioritizing messages based upon the customer indicia, the queue server 410 also may prioritize the messages by performing a keyword search of messages based on the description. Messages that coincide with identified keywords are given an enhanced priority.

As with the embodiment of FIG. 1, the database 430 may associate the customer with more than one field of information. Optionally, the queue: server 410 may identify the relevant fields and prompt the customer to select among them (Steps 2090 and 2100).

When the customer first contacts the queue server, the queue server enters the customer into a queue of holding customers. As with the embodiment of FIG. 1, if they remain in queue long enough, customers advance through the queue established by the queue server and eventually are served by human attendants (Step 2080). The attendants may communicate with the customer through conventional "internet telephony", where voice from the attendant is captured by a microphone associated with an attendant's computer terminal (T1–T6 in FIG. 3), digitized, and routed through the computer network to the customer's terminal 30. The customer's terminal 30 assembles the digitized voice, converts it back to an analog waveform and broadcasts the waveform over speaker equipment at the terminal 30. A complementary process is used to capture the customer's voice, digitize it, route it to the attendant's computer equipment T1 and convert it to an analog waveform for broadcast. In addition to computer telephony, the customer and attendant may communicate through conventional e-mail or chat messaging, or the attendant simply may place a standard telephone call to the customer.

As with the telephonic embodiment, the customer may indicate that his question has been answered by sending a message or other signal to the queue server 410.

As described above, the present invention provides a service whereby substantive information presented to a customer holding in a queue is tailored to the customer's identity. The service associates the customer with a relevant field of information. The service then selects messages associated with the relevant field for presentation to the customer and presents them. In doing so, the present invention may apportion preferences to certain messages based on the messages' demonstrated effectiveness in addressing customer questions. The present invention should answer customers' questions faster than they would if the customer were forced to wait to speak with an attendant. Also, it should permit vendors to reduce the cost of maintaining conventional hotlines. By reducing the number of customers that advance through the queue, the present invention reduces the number of customers that will be serviced by attendants. Consequently, the number and cost of training the attendants may be reduced.

The present invention has been described in the context of a vendor's technical support facility or a hotline. However, the present invention is in no way limited to such an application. The present invention finds application in any system where it may be useful to provide information to persons waiting idle in a queue based upon the persons' identities.

We claim:

1. A method of providing customized information to a customer in a telecommunications queue, comprising the steps of:

storing a plurality of messages in a first memory, each message including a subject-matter identifier, storing a customer profile in a second memory, the customer profile including a field representing a field of information particular to the customer, placing a call of the customer in the telecommunications queue, and while the call is in the telecommunications queue:

identifying the customer who made the call, retrieving the field of information associated with the customer based on the customer's identity, selecting a plurality of messages having a subject-matter identifier that corresponds to the field of information in the customer's profile to be presented to the customer, prioritizing the selected messages based on a predetermined criterion, and sequentially presenting the selected messages to the customer in an order determined by the relative priorities of each selected message.

2. The method of claim 1, wherein the queue is established by a communication network.

3. The method of claim 2, wherein the identifying step includes a step of identifying the customer's ANI.

4. The method of claim 3, wherein the associating step includes a step of retrieving a customer record from a database, said database being indexed by customer ANIs, and identifying the field of information from the customer record.

5. The method of claim 2, wherein the identifying step includes a step of identifying the customer's telephone number.

6. The method of claim 2, wherein the identifying step includes a step of identifying an account number of the customer.

7. The method of claim 2, wherein the identifying step includes a step of identifying a product that the customer owns.

8. The method of claim 2, wherein the identifying step includes a step of identifying a telephone number dialed by the customer.

9. The method of claim 1, wherein the queue is established by a data network.

10. The method of claim 9, wherein the identifying step includes a step of identifying the customer's IP address.

11. The method of claim 9, wherein the identifying step includes a step of identifying the customer's e-mail address.

12. The method of claim 9, wherein the identifying step includes a step of identifying the customer's log on ID.

13. The method of claim 1, wherein the identifying step includes a step of receiving an identifier generated by the customer.

14. The method of claim 1, wherein the predetermined criterion is a history of the customer, in which messages that were presented to the customer during previous calls are assigned a greater priority.

15. The method of claim 1, wherein the predetermined criterion is a history of the customer, in which messages that were presented to the customer during previous calls are assigned a reduced priority.

16. The method of claim 1, wherein the predetermined criterion is the customer's level of expertise.

17. The method of claim 1, wherein the predetermined criterion is an identification of products owned by the customer.

18. The method of claim 1, wherein the predetermined criterion is a demonstrated relevance of respective messages to other customers' questions.

19. The method of claim 18, wherein the predetermined criterion is weighted to favor messages that recently answered other customer's questions.

20. The method of claim 1, wherein the predetermined criterion is a combination of two or more of the following factors: a history of the customer, the customer's level of expertise, an identification of products owned by the customer, and a demonstrated relevance of respective messages to other customers' questions.

21. The method of claim 1, further comprising steps of:
receiving and decoding speech from the customer,
searching for messages containing keywords included in the decoded speech, said predetermined criterion being a correlation between the decoded speech and a message.

22. The method of claim 1, wherein the call is transferred to an attendant when the attendant becomes available.

23. A queue system associated with a communication network populated by a number of communication switches, comprising:
a processor in communication with one of the switches,
a database in communication with the processor, the database storing customer profiles that include a field representing a field of information associated with the customer and storing messages, each message including a subject-matter identifier,
a communication queue,
wherein, when a call of a customer arrives at the queue system, the processor:
places the call in the communication queue,
receives a customer identifier from the communication network,
retrieves a customer profile from the database based on the identifier,
retrieves a field of information from the customer profile,
selects a plurality of messages having a correspondence between the field of information in the customer's profile with the subject-matter identifiers of the messages to be presented to the customer,
prioritizes the selected messages based on a predetermined criterion and
while the call is in the communication queue, sequentially presents the selected messages to the customer in an order determined by the relative priorities of each selected message.

24. The system of claim 23, further comprising a voice response unit,
wherein the messages are audio files, and
wherein the processor causes the voice response unit to play the audio files to the customer while in the queue.

25. The system of claim 23, further comprising a voice response unit,
wherein the messages are text files, and
wherein the processor causes the voice response unit to convert the text file to audio for presentation to the customer while in the queue.

26. The system of claim 23,
wherein, when the subject matter identifiers are associated with multiple fields of information, the processor prompts the customer to indicate a most relevant field of information, and
wherein the processor selects and presents the messages associated with the most relevant field of information.

27. The system of claim 23, wherein the predetermined criterion is a statistically demonstrated relevance of the selected messages within the field of information.

28. The system of claim 23, wherein the processor transfers the call to an attendant when the call advances through the communication queue.

29. A queue system associated with a computer network, comprising:
a server in communication with the network,
a database in communication with the server, the database storing customer records that include a field representing a field of information associated with the customer and storing messages, each message including a subject-matter identifier,
wherein, when a call of a customer arrives at the queue system, the server:
places the call in a queue,
receives a code from the network identifying the customer,
retrieves from the customer record, the field,
selects a plurality of messages having a correspondence between the field of information in the customer's record with the subject-matter identifiers of the messages to be presented to the customer,
prioritizes the selected messages based on a predetermined criterion, and
sequentially presents the selected messages to the customer in an order determined by the relative priorities of each selected message.

30. The system of claim 29,
wherein, when the subject matter identifiers are associated with multiple fields of information, the server prompts the customer to indicate a most relevant field of information, and
wherein the server selects and presents the messages associated with the most relevant field of information.

31. The system of claim 29, wherein the predetermined criterion is a statistically demonstrated relevance of the selected messages within the field of information.

32. The system of claim 29, wherein the server transfers the call to an attendant when the call advances through the queue.

33. A method of providing customized information to customers in a telecommunications queue, comprising the steps of:
storing a plurality of messages in a first memory, each message including a subject-matter identifier,
storing a plurality of customer profiles in a second memory, each customer profile including a field representing a field of information particular to each customer,
placing a call of each customer in the telecommunications queue, and
while each call is in the telecommunications queue:
identifying the customer who made the call,
associating a field of information with the customer based on the customer's identity,
selecting a plurality of messages having a correspondence between the field of information in the customer's profile with the subject-matter identifiers of the messages to be presented to the customer,
prioritizing the selected messages based on a predetermined criterion,
sequentially presenting the selected messages to the customer in an order determined by the relative priorities of each selected message,
wherein messages presented to a first customer are independent of messages played to a second customer.

34. A method of providing customized information to a customer in a telecommunications queue, comprising the steps of:

storing a plurality of messages in a first memory, each message including a subject-matter identifier, storing a customer profile in a second memory, the customer profile including a field representing a field of information particular to the customer, placing a call of the customer in the telecommunications queue, and while the call is in the telecommunications queue:
identifying the customer who made the call,
retrieving the field of information associated with the customer based on the customer's identity,
selecting massages having a correspondence between the field of information in the customer's profile with the subject-matter indentifiers of the messages,
prioritizing the messages based on a predetermined criterion, and
sequentially presenting the messages to the customer according to the messages' priority.

35. The method of claim 34, wherein the predetermined criterion is a history of the customer, in which messages that were presented to the customer during previous calls are assigned a greater priority.

36. The method of claim 34, wherein the predetermined criterion is a history of the customer, in which messages that were presented to the customer during previous calls are assigned a reduced priority.

37. The method of claim 34, wherein the predetermined criterion is the customer's level of expertise.

38. The method of claim 34, wherein the predetermined criterion is an identification of products owned by the customer.

39. The method of claim 34, wherein the predetermined criterion is a demonstrated relevance of respective messages to other customers' questions.

40. The method of claim 39, wherein the predetermined criterion is weighted to favor messages that recently answered other customer's questions.

41. The method of claim 34, wherein the predetermined criterion is a combination of two or more of the following factors: a history of the customer, the customer's level of expertise, an identification of products owned by the customer, and a demonstrated relevance of respective messages to other customers' questions.

42. The method of claim 34, further comprising steps of:
receiving and decoding speech from the customer,
searching for messages containing keywords included in the decoded speech, said predetermined criterion being a correlation between the decoded speech and a message.

43. The method of claim 33, wherein the call is transferred to an attendant when the attendant becomes available.

44. In a telecommunication queue associated with a plurality of applications, a method of providing customized information to a queued customer, comprising the steps of:
storing a plurality of messages in a first memory, each message including a subject-matter identifier field identifying at least one of the applications to which the message is associated,
storing a customer profile in a second memory, the customer profile including an application field representing one or more applications with which the customer is registered,
queuing a call of the customer, and
while the call is queuing:
retrieving the customer's record,
based upon the application field in the customer's record,
selecting a plurality of messages for which the subject-matter identifier field matches the customer's application field,
prioritizing the selected messages based on a predetermined criterion,
sequentially presenting the selected messages to the customer in an order determined by the relative priorities of each message, and
transferring the call to an attendant when the attendant becomes available.

45. A method of providing customized information to a customer in a telecommunications queue, comprising the steps of:
storing a plurality of messages in a first memory, each message including a subject-matter identifier,
storing a customer profile in a second memory, the customer profile including a field representing a field of information particular to the customer,
placing a call of the customer in the telecommunications queue, and
while the call is in the telecommunications queue:
identifying the customer who made the call,
retrieving the field of information associated with the customer based on the customer's identity,
selecting a plurality of messages having a subject-matter identifier that corresponds to the field of information in the customer's profile to be presented to the customer,
prioritizing the selected messages based on a predetermined criterion,
sequentially presenting the selected messages to the customer in an order determined by the relative priorities of each selected message, and
transferring the call to an attendant when the attendant becomes available.

46. A method of providing customized information to customers in a telecommunications queue, comprising the steps of:
storing a plurality of messages in a first memory, each message including a subject-matter identifier,
storing a plurality of customer profiles in a second memory, each customer profile including a field representing a field of information particular to each customer,
placing a call of each customer in the telecommunications queue, and
while each call is in the telecommunications queue:
identifying the customer who made the call,
associating a field of information with the customer based on the customer's identity,
selecting a plurality of messages having a correspondence between the field of information in the customer's profile with the subject-matter identifiers of the messages to be presented to the customer,
prioritizing the selected messages based on a predetermined criterion,
sequentially presenting the selected messages to the customer in an order determined by the relative priorities of each selected message,
wherein the predetermined criterion is a demonstrated relevance of respective messages to other customers' questions.

* * * * *